United States Patent
Schroeder et al.

(10) Patent No.: US 11,230,992 B2
(45) Date of Patent: Jan. 25, 2022

(54) PISTON GEOMETRY FOR REDUCED SMOKE AND CYLINDER HEAD COMPONENT TEMPERATURES

(71) Applicant: Caterpillar Inc., Peoria, IL (US)

(72) Inventors: Eric L. Schroeder, Germantown Hills, IL (US); Christopher R. Gehrke, Chillicothe, IL (US); David A. Pierpont, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/839,423

(22) Filed: Apr. 3, 2020

(65) Prior Publication Data

US 2021/0310438 A1 Oct. 7, 2021

(51) Int. Cl.
   *F02F 3/24* (2006.01)
   *F02F 3/26* (2006.01)
   *F02B 31/00* (2006.01)
   *F02F 3/28* (2006.01)

(52) U.S. Cl.
   CPC .............. *F02F 3/26* (2013.01); *F02B 31/00* (2013.01); *F02F 3/28* (2013.01)

(58) Field of Classification Search
   CPC ............. F02B 23/0672; F02B 23/0696; F02B 23/0693; F02B 23/0621
   USPC ....................................................... 123/307
   See application file for complete search history.

(56) References Cited

U.S. PATENT DOCUMENTS

| | | | | |
|---|---|---|---|---|
| 4,577,595 A | * | 3/1986 | Deutschmann | F02F 3/0069 123/41.35 |
| 6,314,933 B1 | * | 11/2001 | Iijima | F02F 3/26 123/193.6 |
| 6,601,561 B1 | * | 8/2003 | Liu | F02B 23/0672 123/276 |
| 6,935,301 B2 | * | 8/2005 | Liu | F02F 3/26 123/294 |
| 7,040,279 B2 | | 5/2006 | Regueiro | |
| 7,942,126 B2 | * | 5/2011 | Zoller | F02B 23/0693 123/298 |
| 8,156,927 B2 | * | 4/2012 | Iikubo | F02B 23/0672 123/661 |
| 8,677,970 B2 | | 3/2014 | Venugopal et al. | |
| 8,869,770 B2 | | 10/2014 | Bazyn et al. | |
| 9,238,996 B2 | | 1/2016 | Easley et al. | |
| 9,328,693 B2 | | 5/2016 | Pierpont et al. | |
| 10,041,395 B2 | | 8/2018 | Shimo et al. | |
| 10,634,089 B2 | * | 4/2020 | Diwakar | F02F 3/027 |
| 2014/0305402 A1 | * | 10/2014 | Zoeller | F02B 23/0693 123/294 |

(Continued)

*Primary Examiner* — Long T Tran
*Assistant Examiner* — James J Kim
(74) *Attorney, Agent, or Firm* — Law Office of Kurt J. Fugman LLC (57) ABSTRACT

The piston has a contoured combustion bowl with a radially inner shelf portion that is spaced axially away from the radially outer lip portion a first axial distance, and a swirl pocket that extends radially from the radially inner shelf portion and defines a lower axial extremity that is spaced axially away from the radially outer lip portion a second axial distance that is greater than the first axial distance. The swirl pocket defines a tangent extending in the radially outer direction, forming an acute angle with the radially outer lip portion ranging from 70 degrees to 80 degrees.

19 Claims, 9 Drawing Sheets

(56) References Cited

U.S. PATENT DOCUMENTS

2018/0340488 A1* 11/2018 Fukuda .............. F02B 23/0672
2020/0340391 A1* 10/2020 Machold ............. F02B 23/0618

* cited by examiner

PISTON GEOMETRY FOR REDUCED SMOKE AND CYLINDER HEAD COMPONENT TEMPERATURES

TECHNICAL FIELD

The present disclosure relates generally to pistons that are used in internal combustion engines having a contoured piston bowl geometry. More specifically, the present disclosure relates to a piston having a contoured piston bowl geometry for reduced smoke and cylinder head component temperatures.

BACKGROUND

Internal combustion engines are routinely used in various industries to power machines and equipment. Examples of industries using such machines and equipment include marine, earth moving, construction, mining, locomotive and agriculture industries, etc. In certain markets and market segments, internal combustion engines with a high power density are needed or employed. Such engines are sometimes challenged by both high smoke and high valve temperatures or other high cylinder head component temperatures that are developed at the rated condition for the engine.

More specifically, it has been traditionally found that a tradeoff or compromise exists between increasing the number of injector spray holes, which results in reduced spray penetration into the combustion chamber, reducing the heat flux into the exhaust valve, intake valve, and cylinder head, but at the cost of increased smoke development and emissions. In some cases, the limits for smoke and emissions are undesirably approached, risking exceeding these limits.

U.S. Pat. No. 7,040,279 to Regueiro discloses a divided chamber combustion system comprising an energy-cell built in the bottom of a deep piston bowl that is aligned in the cylinder's centerline and that is in fluid communication with the main combustion chamber through one main transfer passage disposed in its centerline and a plurality of auxiliary transfer passages circularly disposed around it. Each auxiliary transfer passage is at least inclined on a plane parallel to the cell's centerline. The injection nozzle, centrally-located in the fire deck of the cylinder head, includes a central pintle discharging fuel on the cylinder's centerline, and a plurality of small auxiliary orifices circularly surrounding the central pintle, discharging at a radial angle to the cylinder's centerline.

As can be seen, the piston design of Regueiro does not address some of the current design tradeoffs such as reducing smoke development and cylinder head component temperatures simultaneously.

SUMMARY OF THE DISCLOSURE

A piston configured to reciprocate in the bore of an engine according to a first embodiment of the present disclosure is provided. The piston may comprise an annular body including a crown portion defining a longitudinal axis, a radial direction perpendicular to the longitudinal axis, a plane containing the longitudinal axis and the radial direction, and a contoured combustion bowl. In the plane containing the longitudinal axis and the radial direction, the crown portion may include a radially outer lip portion, and the contoured combustion bowl may include a radially inner shelf portion that is spaced axially away from the radially outer lip portion a first axial distance. A swirl pocket may extend radially from the radially inner shelf portion and define a lower axial extremity that is spaced axially away from the radially outer lip portion a second axial distance that is greater than the first axial distance. The swirl pocket may define a tangent extending in the radially outer direction and that forms an acute angle with the radially outer lip portion ranging from 70 degrees to 80 degrees.

A piston configured to reciprocate in the bore of an engine according to a second embodiment of the present disclosure is provided. The piston may comprise an annular body including a crown portion defining a longitudinal axis, a radial direction perpendicular to the longitudinal axis, a plane containing the longitudinal axis and the radial direction, and a contoured combustion bowl. In the plane containing the longitudinal axis and the radial direction, the crown portion may include a radially outer lip portion including a top squish surface, and the contoured combustion bowl includes a radially inner planar shelf surface that is spaced axially away from the top squish surface a first axial distance, and that is connected to the top squish surface by a concave blend that is tangent to the radially inner planar shelf surface and extends axially upwardly to the top squish surface. A swirl pocket may include a bottom concave arcuate surface extending axially downwardly and radially inwardly from the radially inner planar shelf surface, defining a lower axial extremity that is spaced axially away from the top squish surface a second axial distance. A ratio of the first axial distance to the second axial distance may range from 10% to 15%.

A piston configured to reciprocate in the bore of an engine according to a third embodiment of the present disclosure is provided. The piston may comprise an annular body including a crown portion defining a longitudinal axis, a radial direction perpendicular to the longitudinal axis, a plane containing the longitudinal axis and the radial direction, and a contoured combustion bowl. In the plane containing the longitudinal axis and the radial direction, the crown portion may include a radially outer lip portion including a top squish surface defining a first radial dimension, and the contoured combustion bowl may include a radially inner planar shelf surface that is spaced axially away from the top squish surface a first axial distance, and that is connected to the top squish surface by an undulating transitional surface that is tangent to the radially inner planar shelf surface and extends radially outwardly and axially downwardly to a trough point and then axially upwardly and radially outwardly to the top squish surface. A swirl pocket may include a bottom concave arcuate surface extending axially downwardly and radially inwardly from the radially inner planar shelf surface, defining a lower axial extremity that is spaced axially away from the top squish surface a second axial distance. A ratio of the first axial distance to the second axial distance may range from 10% to 15%.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a piston that may be used in an internal combustion engine with or without a cooling gallery, and a crown portion with a piston bowl geometry according to various embodiments of the present disclosure will now be described. More particularly, these pistons may provide reduced soot emissions and/or reduced cylinder head component temperatures when the engine is operated at is its rated load.

Figure 1:
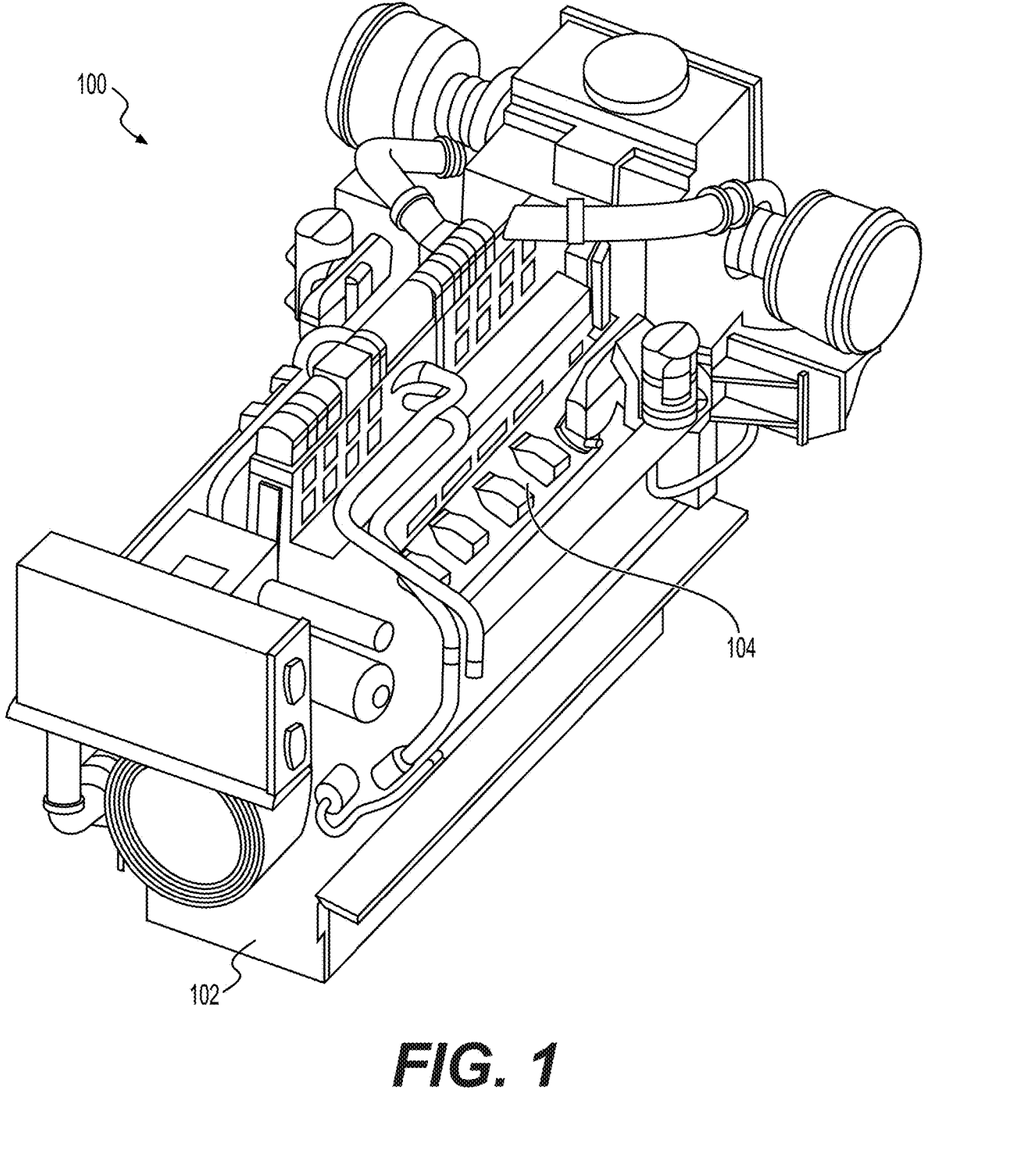
FIG. 1 is a perspective view of an internal combustion engine that may employ pistons according to various embodiments of the present disclosure.

For example, an internal combustion engine 100 is shown in FIG. 1 that may employ various embodiments of the piston constructed according to the principles set forth herein. The engine 100 may include an engine block 102 in which the piston (not shown) reciprocates, and a cylinder head 104 that may contain various engine components for the introduction of fluids into the bore/combustion chamber located in the engine block 102.

Figure 2:
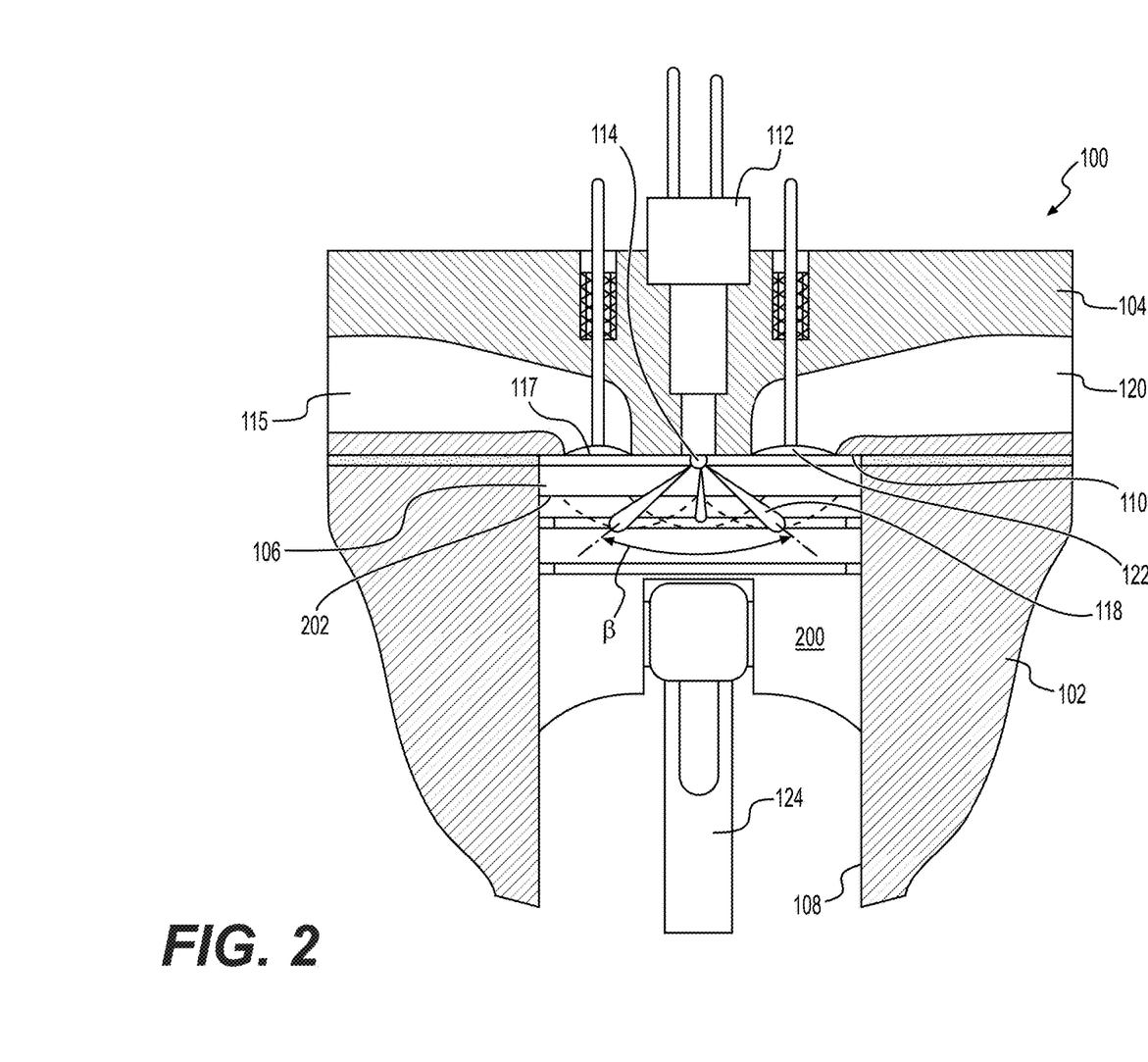
FIG. 2 is a sectioned side view of the internal combustion engine of FIG. 1, showing a piston according to an embodiment of the present disclosure that is disposed in a cylinder bore for reciprocating movement therein.

Turning to FIG. 2, a portion of the engine 100 is shown sectioned, revealing the combustion chamber 106 that may have a generally cylindrical shape that is defined within a cylinder bore 108 formed within the crankcase or engine block 102 of the engine 100. The combustion chamber 106 is further defined at one end by a flame deck surface 110 of the cylinder head 104, and at another end by a crown portion 202 of a piston 200 that is reciprocally disposed within the bore 108, and is connected to a connecting rod 124, which in turn is connected to a crank shaft (not shown). A fuel injector 112 is mounted in the cylinder head 104. The injector 112 has a tip 114 that protrudes within the combustion chamber 106 through the flame deck surface 110 such that it can directly inject fuel into the combustion chamber 106.

During operation of the engine 100, air is admitted into the combustion chamber 100 via an air inlet passage 115 when one or more intake valves 117 (one shown) are open during an intake stroke. In a known configuration, high pressure fuel is permitted to flow through nozzle openings (referred to later herein as holes) in the tip 114 to form fuel jets that enter the combustion chamber 106. Each nozzle opening creates a fuel jet 118 that generally disperses to create a predetermined fuel/air mixture, which in a compression ignition engine auto-ignites and combusts. The fuel jets 118 may be provided from the injector at an included angle β of between 110 and 150 degrees, but other angles may also be used. Following combustion, exhaust gas is expelled from the combustion chamber through an exhaust conduit 120 when one or more exhaust valves 122 (one shown) is/are open during an exhaust stroke.

The uniformity and extent of fuel/air mixing in the combustion cylinder is relevant to the combustion efficiency as well as to the amount and type of combustion byproducts that are formed. For example, fuel-rich mixtures, which may be locally present within the combustion chamber 106 during a combustion event due to insufficient mixing, may lead to higher soot emissions and lower combustion efficiency.

Looking at FIGS. 3 thru 5, various embodiments of a piston 200 (see FIG. 3), 300 (see FIG. 4), 400 (see FIG. 5) that may be used in the engine 100 just described and that may decrease soot emissions and cylinder head component temperatures simultaneously will now be discussed in greater detail with reference to the cross-sectional geometry of the pistons.

The piston 200, 300, 400 may comprise an annular body 204, 304, 404 including a crown portion 202, 302, 402 defining a longitudinal axis 206, 306, 406, a radial direction perpendicular 208, 308, 408 to the longitudinal axis 206, 306, 406, and a plane (e.g. the sectioned plane shown in FIGS. 3 thru 5) containing the longitudinal axis 206, 306, 406 and the radial direction 208, 308, 408.

The crown portion 202, 302, 402 may also include a contoured combustion bowl 210, 310, 410. Also, the crown portion 202, 302, 402 may include a radially outer lip portion 212, 312, 412, while the contoured combustion bowl 210, 310, 410 may include a radially inner shelf portion 214, 314, 414 that is spaced axially away from the radially outer lip portion 212, 312, 412 a first axial distance 216, 316, 416.

A swirl pocket 218, 318, 418 may extend radially (e.g. directly or indirectly) from the radially inner shelf portion 214, 314, 414, and may define a lower axial extremity 220, 320, 420 that is spaced axially away from the radially outer lip portion 212, 312, 412 a second axial distance 222, 322, 422 that is greater than the first axial distance 216, 316, 416. Moreover, the swirl pocket 218, 318, 418 may define a tangent 224, 324, 424 extending in the radially outer direction and that forms an acute angle 226, 326, 426 with the radially outer lip portion 212, 312, 412 ranging from 70 degrees to 80 degrees (e.g. 75.0 degrees) in the plane containing the longitudinal axis 206, 306, 406, and the radial direction 208, 308, 408.

In some embodiments, the crown portion 202, 302, 402 is defined solely by revolving the geometry of the radially outer lip portion 212, 312, 412, and the contoured combustion bowl 210, 310, 410 in the plane containing the longitudinal axis 206, 306, 406, and the radial direction 208, 308, 408 about the longitudinal axis 206, 306, 406 an amount of 360 degrees. As a result, the cross-section geometry of the crown portion is the same in any plane containing the longitudinal axis and the radial direction. This may not be the case for other embodiments of the present disclosure.

Figure 3:
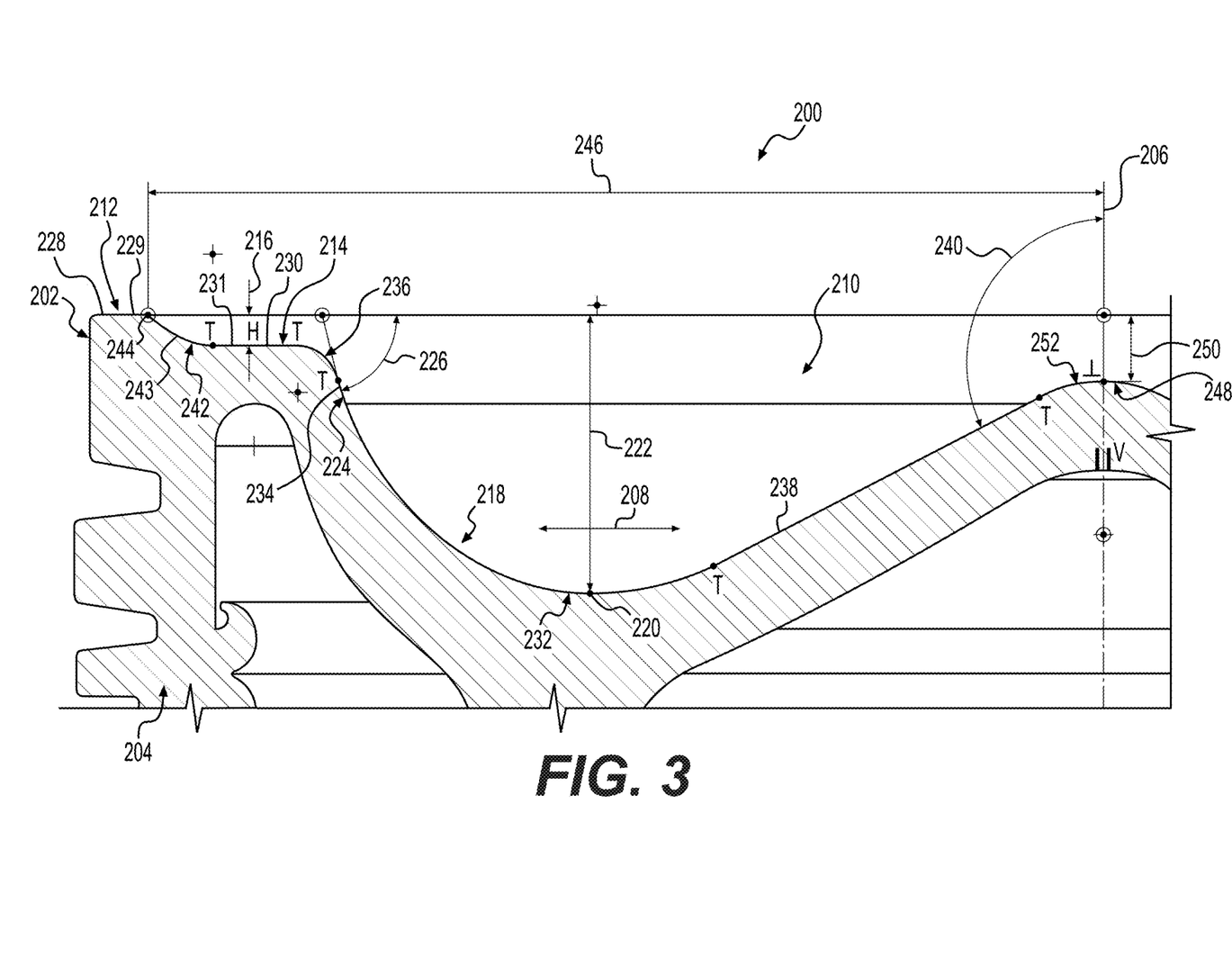
FIG. 3 is an enlarged sectioned side view of the piston of FIG. 2 shown in isolation from the internal combustion engine of FIG. 2.
Figure 4:
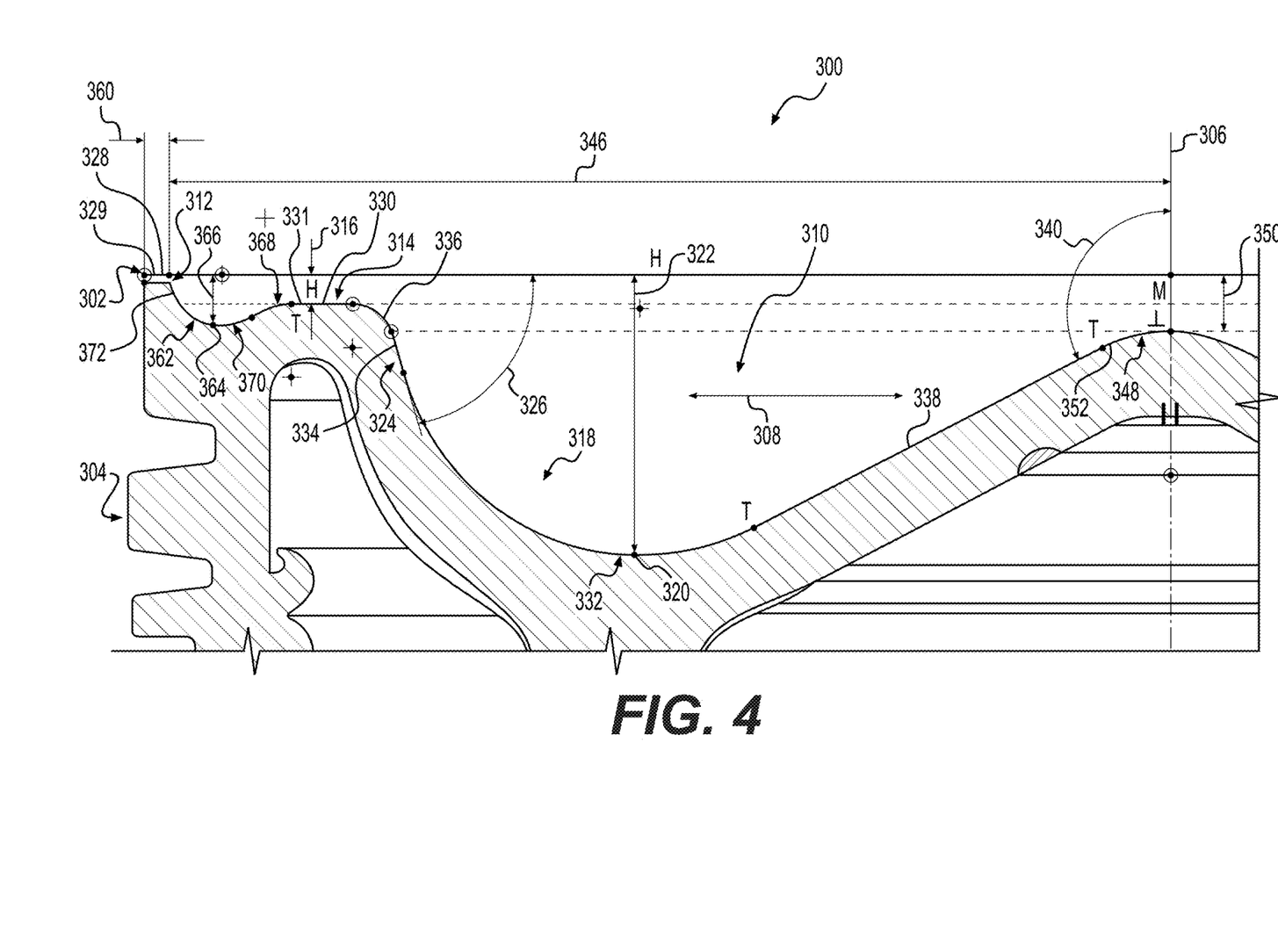
FIG. 4 is an enlarged sectioned side view of a piston having a contoured piston bowl geometry according to another embodiment of the present disclosure that may be used in the internal combustion engine of FIG. 1.
Figure 5:
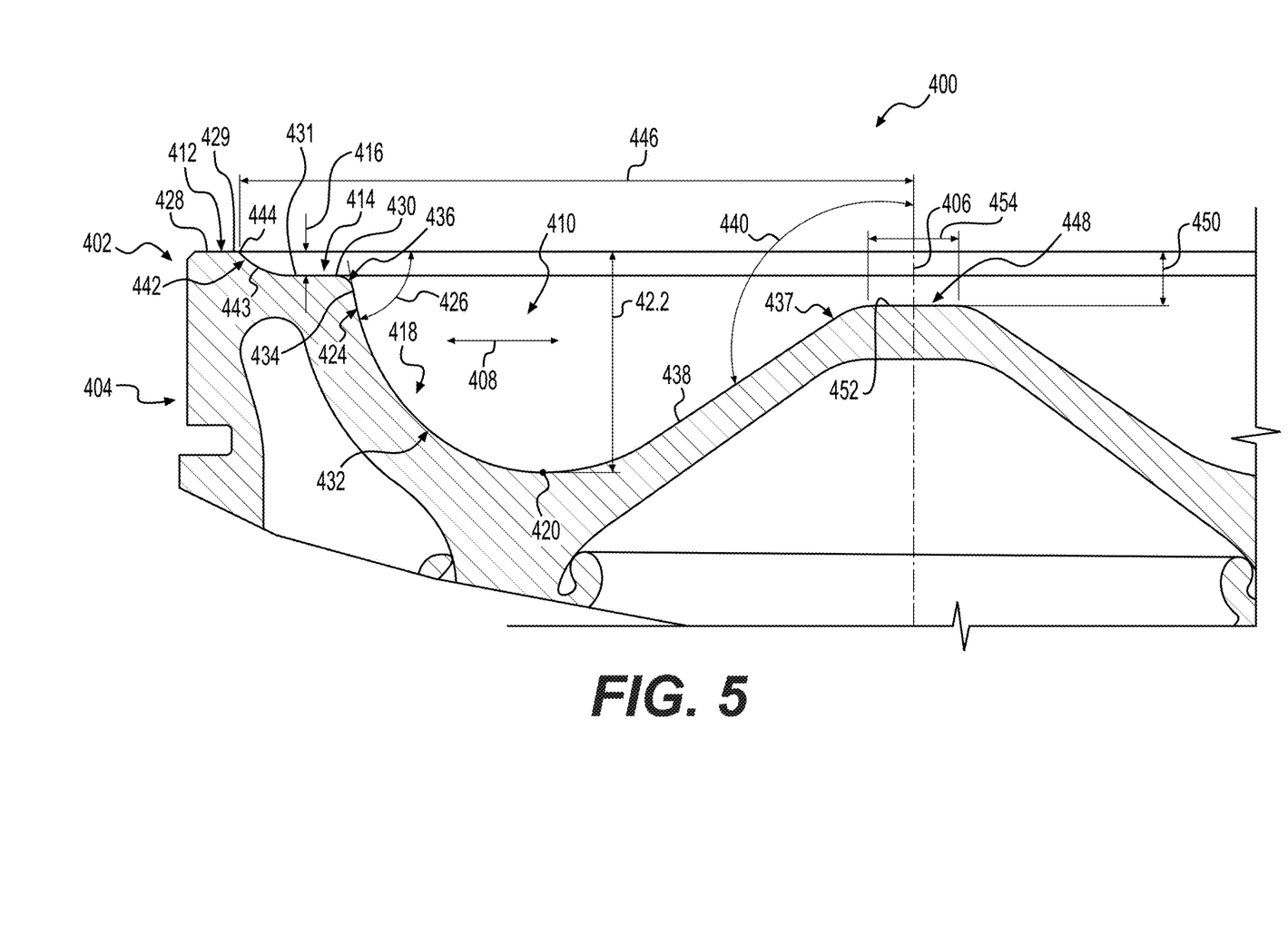
FIG. 5 is an enlarged sectioned side view of a piston having a contoured piston bowl geometry according to yet another embodiment of the present disclosure that may be used in the internal combustion engine of FIG. 1.

With continued reference to FIGS. 3 thru 5, it can be seen that the radially outer lip portion 212, 312, 412 may include a planar squish surface 228, 328, 428 (e.g. may be perpendicular to the longitudinal axis, so called since this surface squishes or squeezes the fluid in the bore as the piston approaches the cylinder head), and the radially inner shelf portion 214, 314, 414 may include a planar shelf surface 230, 330, 430 (e.g. may be parallel to the planar squish surface) that is spaced axially away from the planar squish surface 228, 328, 428 the first axial distance 216, 316, 416.

Likewise, the swirl pocket 218, 318, 418 may include a bottom concave arcuate surface 232, 332, 432 defining the lower axial extremity 220, 320, 420 of the swirl pocket 218 that is spaced axially away from the planar squish surface 228, 328, 428 the second axial distance 222, 322, 422. Other configurations of the swirl pocket are possible in other embodiments of the present application. In certain embodiments, a ratio of the first axial distance 216, 316, 416 to the second axial distance 222, 322, 422 may range from 10% to 15%. Also, the first axial distance 216, 316, 416 may range from 1.5 millimeters to 3.5 millimeters in various embodiments of the present disclosure (e.g. 2.0 millimeters in FIGS. 3 and 4, 2.5 millimeters in FIG. 5). Other dimensional ranges are possible in other embodiments of the present disclosure.

As used herein, "arcuate" includes any shape that is not straight or flat including a radius, an ellipse, a polynomial, a spline, etc.

In the embodiments shown in FIGS. 3 thru 5, the swirl pocket 218, 318, 418 may include a first conical surface 234, 334, 434 that extends radially and axially (e.g. directly or indirectly) from the planar shelf surface 230, 330, 430, defining the tangent 224, 324, 424 that forms the acute angle 226, 326, 426 with the planar squish surface 228, 328, 428 projected onto the plane containing the longitudinal axis 206, 306, 406, and the radial direction 208, 308, 408. This first conical surface may be omitted or substituted with an arcuate surface, etc. in other embodiments of the present disclosure.

A first transitional blend 236, 336, 436 may connect the first conical surface 234, 334, 444 to the planar shelf surface 230, 330, 430. In such a case, the first transitional blend 236, 336, 436 may define a radius of curvature that ranges from 1.0 mm to 10.0 mm (e.g. 2.0 mm in FIG. 5, 3.0 mm in FIGS. 3 and 4). This may not be the case for other embodiments of the present disclosure. As used herein, the term "blend" may include any suitable geometry including a radius or other arcuate curve segment(s).

Similarly, the swirl pocket 218, 318, 418 may also include a second conical surface 238, 338, 438 that extends from the bottom concave surface 232, 332, 432 toward the longitudinal axis 206, 306, 406, forming an outside obtuse angle 240, 340, 440 with the longitudinal axis 238, 338, 438 ranging from 110 degrees to 130 degrees projected onto the plane containing the longitudinal axis 238, 338, 438 and the radial direction 208, 308, 408. Angle 240 may be approximately 116.0 degrees (+/10.0 degrees), angle 340 may be approximately 117.0 degrees (+/−10.0 degrees), and angle 440 may be approximately 124.0 degrees (+/−10.0 degrees)). The range of these angles may be different in other embodiments of the present disclosure.

In some embodiments, the bottom concave arcuate surface 232, 332, 432 defines a radius of curvature ranging from 15.0 mm to 25.0 mm in the plane containing the longitudinal axis 206, 306, 406, and the radial direction 208, 308, 408 (e.g. 18.8 millimeters in FIG. 3, 17.0 millimeters in FIG. 4, 22.0 millimeters in FIG. 5). Other dimensional ranges are possible.

In FIGS. 3 and 5, the contoured combustion bowl 210, 410 may further include a radially outer blend 242, 442 extending tangentially from the planar shelf surface 230, 430 axially upwardly toward the planar squish surface 228, 428. In such embodiments, the radially outer blend 242, 442 may define an outer blend radius of curvature ranging from 5.0 mm to 10.0 mm in the plane containing the longitudinal axis 206, 406, and the radial direction 208, 408 (e.g. 6.0 millimeters in FIG. 3, 7.0 millimeters in FIG. 5).

The radially outer blend 242, 442 connects to the planar squish surface 228, 428 at a cusp 244, 444 (i.e. no tangency), and the contoured combustion bowl 210, 410 defines a combustion bowl radius 246, 446 ranging from 65.0 mm to 80.0 mm that is measured from the cusp 244, 444 to the longitudinal axis 206, 406 (e.g. 67.1 millimeters in FIG. 3, 76.0 millimeters in FIG. 5). A similar combustion bowl radius 346 is shown in FIG. 4 that may be approximately 69.1 millimeters.

Since the pistons 200, 400 of FIGS. 3 and 5 are similarly configured, these pistons may also be described in similar terms as follows.

For each piston 200, 400, the crown portion 202, 402 may include a radially outer lip portion 212, 412 including a top squish surface 229, 429, and the contoured combustion bowl 210, 410 may include a radially inner planar shelf surface 231, 431 that is spaced axially away from the top squish surface 229, 429 a first axial distance 216, 416. The radially inner planar shelf surface 231, 431 may be connected to the top squish surface 229, 429 by a concave blend 243, 443 that is tangent to the radially inner planar shelf surface 231, 431 and extends axially upwardly to the top squish surface 229, 429.

In some embodiments, the swirl pocket 218, 418 may include a bottom concave arcuate surface 232, 432 extending axially downwardly and radially inwardly from the radially inner planar shelf surface 231, 431, defining a lower axial extremity 220, 420 that is spaced axially away from the top squish surface 229, 429 a second axial distance 222, 422. A ratio of the first axial distance 216, 416 to the second axial distance 222, 422 may range from 10% to 15%. Other dimensional ranges are possible.

As alluded to earlier herein, the swirl pocket 218, 418 may include a first conical surface 234, 434 that is interposed radially and axially between the radially inner planar shelf surface 231, 431 and the bottom concave arcuate surface 232, 432. This arrangement may define a tangent 224, 424 that forms an acute angle 226, 426 with the top squish surface 229, 429 projected onto the plane containing the longitudinal axis 206, 406 and the radial direction 208, 408 ranging from 70 degrees to 80 degrees (e.g. 75.0 degrees).

The swirl pocket 218, 418 may also include a second conical surface 238, 438 that extends tangentially from the bottom concave arcuate surface 232, 432 toward the longitudinal axis 206, 406, forming an outside obtuse angle 240, 440 with the longitudinal axis 206, 406 ranging from 110 degrees to 130 degrees when projected onto the plane containing the longitudinal axis 206, 406 and the radial direction 208, 408.

A peak 248, 448 may extend (e.g. tangentially) from the second conical surface 238, 438. The peak 248, 448 may be centered at the longitudinal axis 206, 406, and may be spaced axially away from the top squish surface 229, 429 an axial offset distance 250, 450 that is projected onto the plane containing the longitudinal axis 206, 406, and the radial direction 208, 408 ranging from 3.5 mm to 6.0 mm (e.g. 4.060 millimeters in FIG. 3, 5.5 millimeters in FIG. 5).

In FIG. 3, the peak 248 is formed by a convex arcuate surface 252 (e.g. may be spherical having a radius of curvature of 10.0 millimeters). In FIG. 5, the peak 448 is formed at least partially by a circular planar surface 452 having a diameter 454 of about 10.5 millimeters. In such an embodiment, a second transitional blend 437 may be provided having a radius of curvature of 5.0 millimeters. Other configurations and dimensional ranges are possible in other embodiments of the present disclosure.

Next, the specific geometry of the piston 300 of FIG. 4 will be discussed as follows. The piston 300 may have a crown portion 302 that includes a radially outer lip portion 312 including a top squish surface 329 defining a first radial dimension 360, and the contoured combustion bowl 310 includes a radially inner planar shelf surface 331 that is spaced axially away from the top squish surface 329 a first axial distance 316. The radially inner planar shelf surface 331 may be connected to the top squish surface 329 by an undulating transitional surface 362 that is tangent to the radially inner planar shelf surface 331, and extends radially outwardly and axially downwardly to a trough point 364. Then, this surface 362 extends axially upwardly and radially outwardly to the top squish surface 329.

The swirl pocket 318 may include a bottom concave arcuate surface 332 that extends axially downwardly and radially inwardly from the radially inner planar shelf surface 331, defining a lower axial extremity 320 that is spaced axially away from the top squish surface 329 a second axial distance 322. A ratio of the first axial distance 316 to the second axial distance 322 may range from 10% to 15% in some embodiments.

The trough point 364 may be spaced axially away from the top squish surface 329 a third axial distance 366 that is greater than the first axial distance 316, but is less than the second axial distance 322.

The swirl pocket 318 may include a first conical surface 334 that is interposed radially and axially between the radially inner planar shelf surface 331, and the bottom concave arcuate surface 332. This surface 334 may define a tangent 324 that forms an acute angle 326 with the top squish surface 329 that is projected onto the plane containing the longitudinal axis 306 and the radial direction 308 ranging from 70 degrees to 80 degrees (e.g. 75.0 degrees). This conical surface may be omitted in other embodiments of the present disclosure.

Furthermore, the swirl pocket 318 may include a second conical surface 338 extending tangentially from the bottom concave arcuate surface 332 toward the longitudinal axis 306, forming an outside obtuse angle 340 with the longitudinal axis 306 ranging from 110 degrees to 130 degrees when projected onto the plane containing the longitudinal axis 306 and the radial direction 308.

In some embodiments, the first radial dimension 360 of the top squish surface 329 may range from 1.5 mm to 2.5 mm. A peak 348 may also be provided that extends from the second conical surface 338 that is centered at the longitudinal axis 306. The peak 348 may be spaced axially away from the top squish surface 329 an axial offset distance 350 that is projected onto the plane containing the longitudinal axis 306 and the radial direction 308 ranging from 3.0 mm to 6.0 mm (e.g. 4.0 millimeters). As shown in FIG. 4, the peak 348 is formed by a convex arcuate surface 352 similar to that of FIG. 3.

The undulating transitional surface 362 may include a convex blend portion 368 connected to the radially inner planar shelf surface 331, and defining a convex blend portion radius of curvature ranging from 4.0 millimeters to 6.0 millimeters (e.g. 5.0 millimeters), a concave blend portion 370 connected to the convex blend portion 368, defining the trough point 364 and a concave blend portion radius of curvature ranging from 3.0 millimeters to 4.0 millimeters (e.g. 3.5 millimeters), and a transitional portion 372 (may be conical or arcuate, etc.) connecting the concave blend portion 370 to the top squish surface 329 at the cusp 344.

The configuration and dimensional ranges of any of the embodiments discussed herein may be altered to be different depending on the application.

The piston may be fabricated from steel, cast aluminum alloy, forged aluminum alloy or other suitable material that is durable, corrosion resistant, etc. The geometry of the crown portion may be formed during the casting or forging process and then may be rough machined and/or finish machined if necessary. Suitable machining processes may include milling, turning, electrical discharge machining, etc.

INDUSTRIAL APPLICABILITY

In practice, a piston, a crown portion of a piston, and/or an engine assembly using such a piston or crown portion of a piston according to any embodiment described herein may be provided, sold, manufactured, and bought etc. as needed or desired in an aftermarket or OEM (original equipment manufacturer) context. For example, a crown portion or a piston may be used to retrofit an existing engine already in the field or may be sold with an engine or a piece of equipment using that engine at the first point of sale of the piece of equipment.

Figure 6:
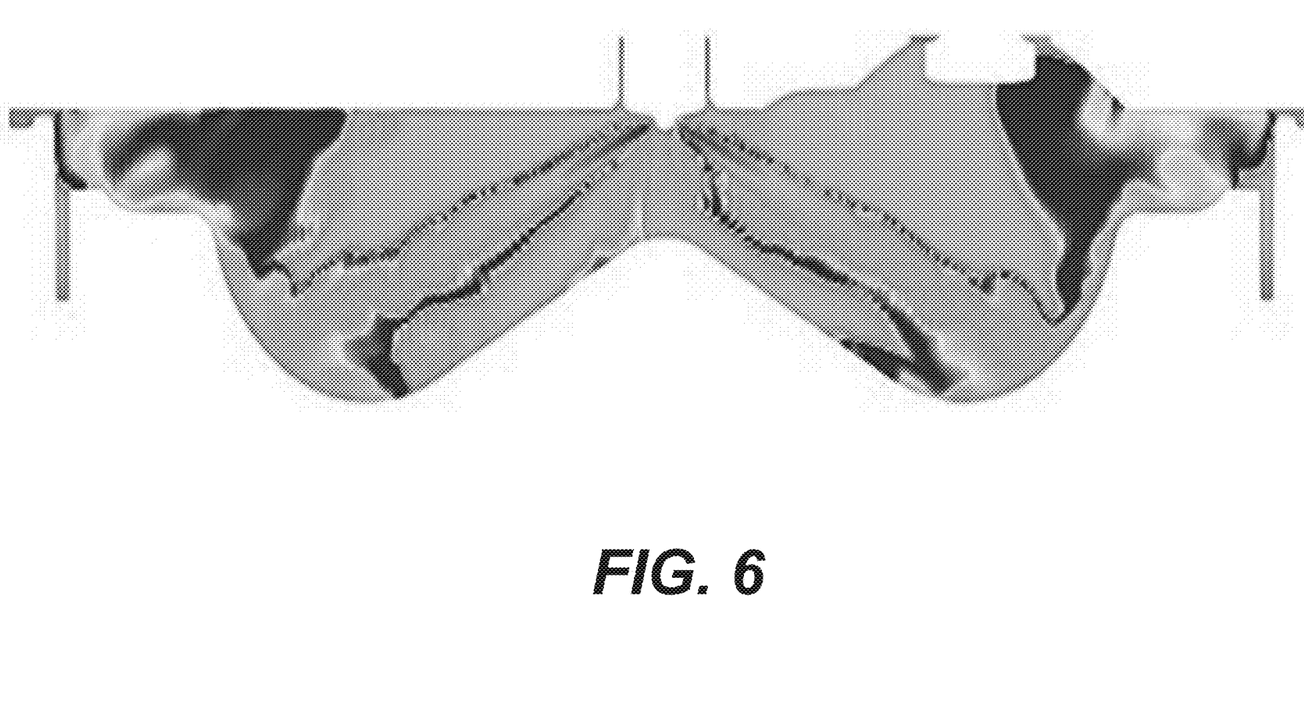
FIG. 6 is a CFD (computational fluid dynamics) graph showing combustion gases being directed away from the cylinder liner and/or piston rings for various embodiments of the present disclosure.

Looking at FIGS. 3 and 6, one skilled in the art can appreciate that improvements in engines using the pistons discussed herein are expected via CFD. Since the piston bowl rim is angled radially outwardly towards the cylinder liner and piston rings, one skilled in the art would expect oil sooting and increased temperatures for these components to occur. However, the lip at the outer edge forces combustion products up and away from the piston rings and cylinder liner, which negates these expected negative impacts of the design.

Figure 7:
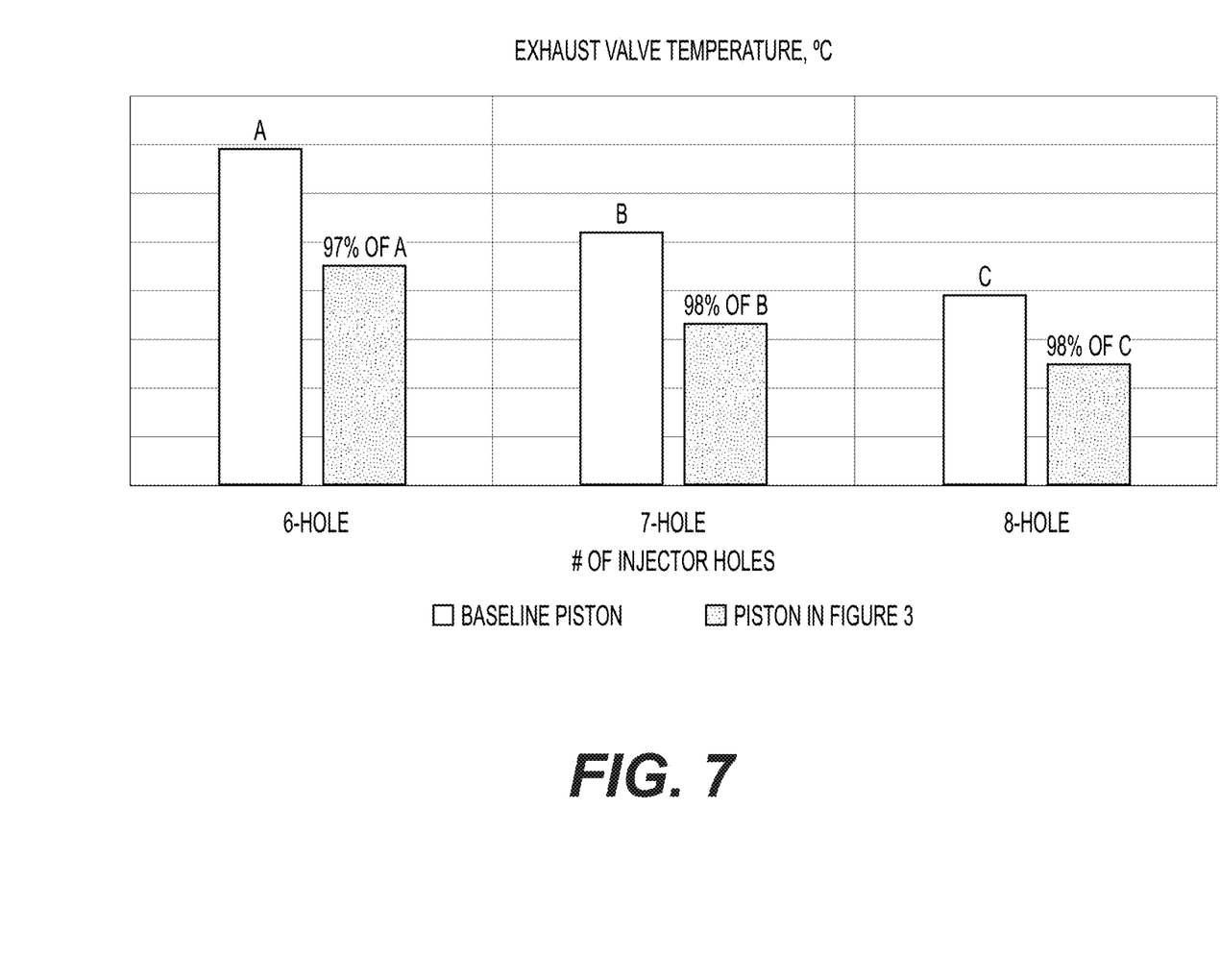
FIG. 7 is a CFD based bar graph showing the improvement of exhaust valve temperature according to various embodiments of the present disclosure.

FIG. 7 indicates that even with an increased number of holes in the injector, the temperature of the exhaust valve decreases.

Figure 8:
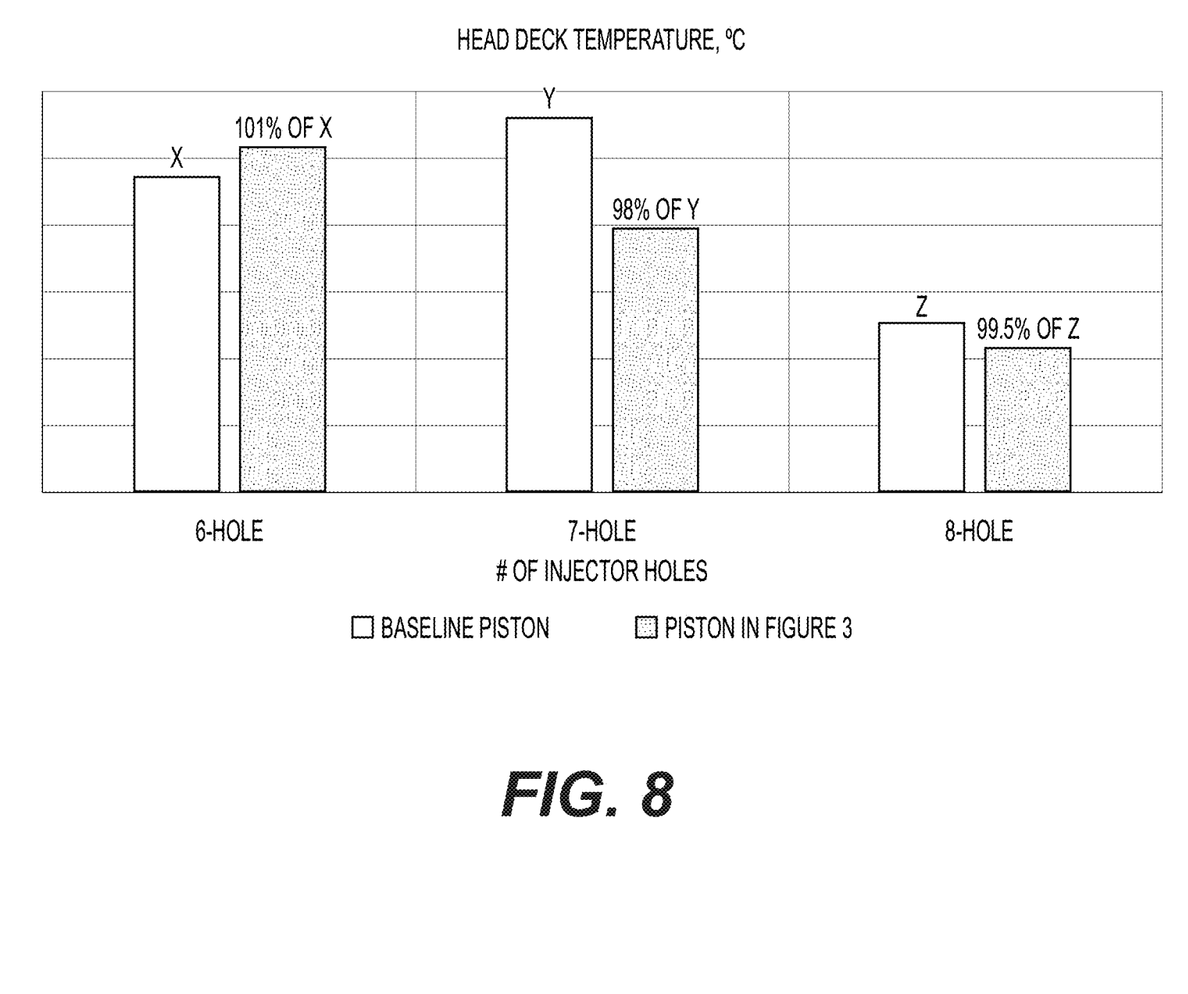
FIG. 8 is a CFD based bar graph showing the improvement of head deck temperature according to various embodiments of the present disclosure.

Similarly, FIG. 8 indicates that the head deck temperature unexpectedly decreases as the number of injector holes increases.

Figure 9:
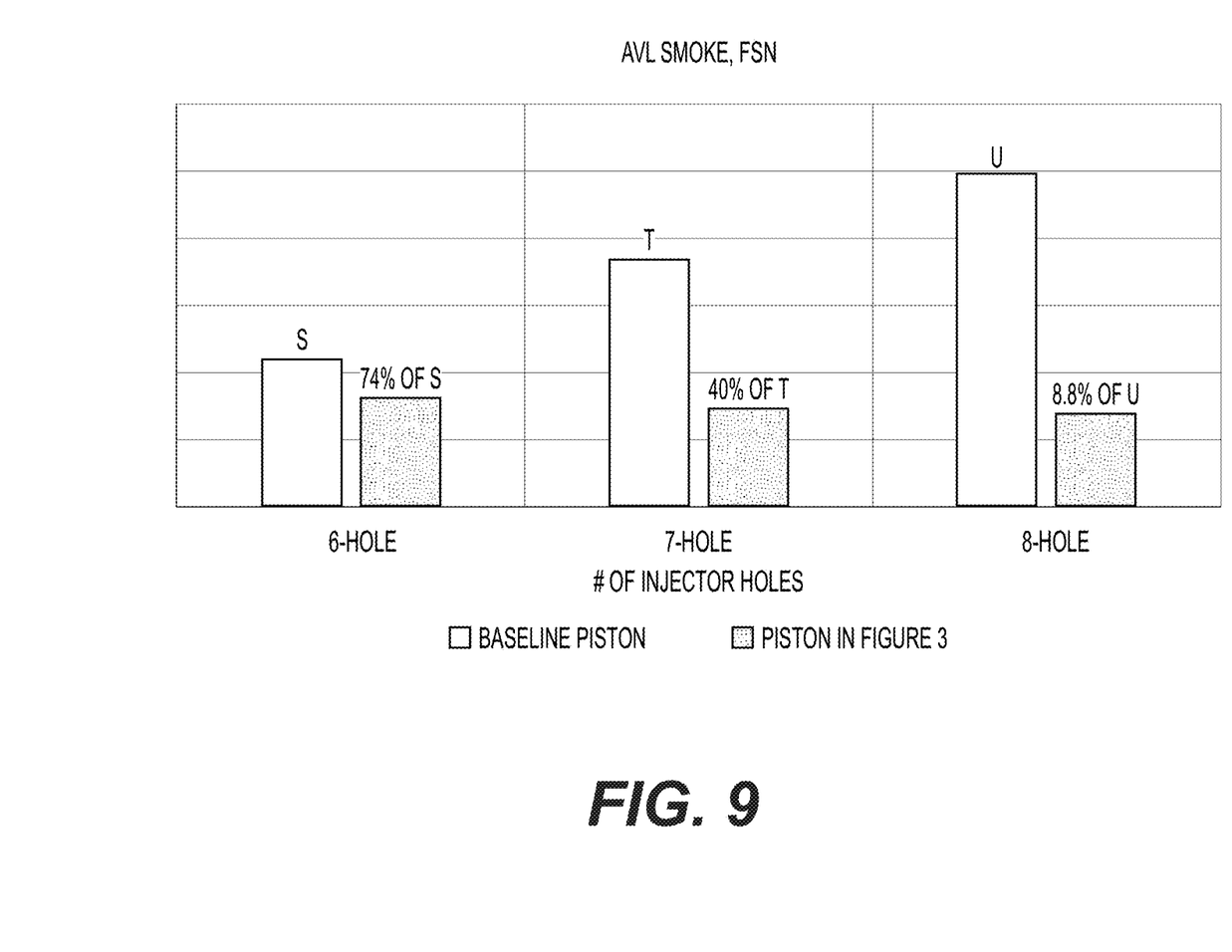
FIG. 9 is a CFD based bar graph showing the improvement of smoke development according to various embodiments of the present disclosure.

Finally, FIG. 9 indicates that smoke development decreases as the number of injector holes increases.

As can be seen, various embodiments of the present disclosure break the tradeoff between reducing component temperatures and smoke/emissions simultaneously that is found in the prior art as discussed above in the "Background" section herein.

The disclosed piston geometry, when combined with a diesel injector with 8 or 9 holes, decreases heat transfer into the valves and cylinder head which reduces their temperatures at high fuel injection rates. This piston geometry has also demonstrated improved fuel economy and reduced smoke development at high load conditions while still providing acceptable exhaust emissions at lower loads.

It will be appreciated that the foregoing description provides examples of the disclosed assembly and technique.

However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A piston configured to reciprocate in the bore of an engine, the piston comprising:
   an annular body including a crown portion defining a longitudinal axis, a radial direction perpendicular to the longitudinal axis, a plane containing the longitudinal axis and the radial direction, and a contoured combustion bowl;
   wherein in the plane containing the longitudinal axis and the radial direction
      the crown portion includes a radially outer lip portion, and
      the contoured combustion bowl includes a radially inner shelf portion that is spaced axially away from the radially outer lip portion a first axial distance, and
      a swirl pocket that extends radially from the radially inner shelf portion and defines a lower axial extremity that is spaced axially away from the radially outer lip portion a second axial distance that is greater than the first axial distance, the swirl pocket defining an edge extending in the radially outer direction and that forms an acute angle with the radially outer lip portion ranging from 70 degrees to 80 degrees, and the swirl pocket includes a first conical surface extending radially and axially from the planar shelf surface, forming the edge that defines the acute angle with the planar squish surface projected onto the plane containing the longitudinal axis and the radial direction.

2. The piston of claim 1 wherein the crown portion is defined solely by revolving the radially outer lip portion and the contoured combustion bowl in the plane containing the longitudinal axis and the radial direction about the longitudinal axis an amount of 360 degrees.

3. The piston of claim 1 wherein the radially outer lip portion includes a planar squish surface, the radially inner shelf portion includes a planar shelf surface that is spaced axially away from the planar squish surface the first axial distance, the swirl pocket includes a bottom concave arcuate surface defining the lower axial extremity that is spaced axially away from the planar squish surface the second axial distance, and a ratio of the first axial distance to the second axial distance ranges from 10% to 15%.

4. The piston of claim 3 wherein the swirl pocket includes a second conical surface extending from the bottom concave surface toward the longitudinal axis, forming an outside obtuse angle with the longitudinal axis ranging from 110 degrees to 130 degrees projected onto the plane containing the longitudinal axis and the radial direction.

5. The piston of claim 3 wherein the first axial distance ranges from 1.5 millimeters to 3.5 millimeters.

6. The piston of claim 3 wherein the bottom concave arcuate surface defines a radius of curvature ranging from 15.0 mm to 25.0 mm in the plane containing the longitudinal axis and the radial direction.

7. The piston of claim 3 wherein the contoured combustion bowl further includes a radially outer blend extending tangentially from the planar shelf surface axially upwardly toward the planar squish surface.

8. The piston of claim 7 wherein the radially outer blend defines an outer blend radius of curvature ranging from 5.0 mm to 10.0 mm in the plane containing the longitudinal axis and the radial direction.

9. The piston of claim 1 wherein the radially outer blend connects to the top squish surface at a cusp, and the contoured combustion bowl defines a combustion bowl radius ranging from 65.0 mm to 80.0 mm that is measured from the cusp to the longitudinal axis.

10. A piston configured to reciprocate in the bore of an engine, the piston comprising:
    an annular body including a crown portion defining a longitudinal axis, a radial direction perpendicular to the longitudinal axis, a plane containing the longitudinal axis and the radial direction, and a contoured combustion bowl;
    wherein in the plane containing the longitudinal axis and the radial direction
       the crown portion includes a radially outer lip portion including a top squish surface, and
       the contoured combustion bowl includes a radially inner planar shelf surface that is spaced axially away from the top squish surface a first axial distance, and that is connected to the top squish surface by a concave blend that is tangent to the radially inner planar shelf surface and extends axially upwardly to the top squish surface, and
       a swirl pocket that includes a bottom concave arcuate surface extending axially downwardly and radially inwardly from the radially inner planar shelf surface and defining a lower axial extremity that is spaced axially away from the top squish surface a second axial distance, and a ratio of the first axial distance to the second axial distance ranges from 10% to 15%;

wherein the swirl pocket includes a first conical surface that is interposed radially and axially between the radially inner planar shelf surface and the bottom concave arcuate surface.

11. The piston of claim 10 wherein the defines a tangent that forms an acute angle with the top squish surface projected onto the plane containing the longitudinal axis and the radial direction ranging from 70 degrees to 80 degrees.

12. The piston of claim 11 wherein the swirl pocket includes a second conical surface extending tangentially from the bottom concave arcuate surface toward the longitudinal axis, forming an outside obtuse angle with the longitudinal axis ranging from 110 degrees to 130 degrees when projected onto the plane containing the longitudinal axis and the radial direction.

13. The piston of claim 12 further including a peak extending from the second conical surface and that is centered at the longitudinal axis, the peak being spaced axially away from the top squish surface an axial offset distance projected onto the plane containing the longitudinal axis and the radial direction ranging from 3.5 mm to 6.0 mm.

14. The piston of claim 13 wherein the peak is formed by a convex arcuate surface or a circular planar surface.

15. A piston configured to reciprocate in the bore of an engine, the piston comprising:
   an annular body including a crown portion defining a longitudinal axis, a radial direction perpendicular to the longitudinal axis, a plane containing the longitudinal axis and the radial direction, and a contoured combustion bowl;
   wherein in the plane containing the longitudinal axis and the radial direction
      the crown portion includes a radially outer lip portion including a top squish surface defining a first radial dimension, and
      the contoured combustion bowl includes a radially inner planar shelf surface that is spaced axially away from the top squish surface a first axial distance, and that is connected to the top squish surface by an undulating transitional surface that is tangent to the radially inner planar shelf surface and extends radially outwardly and axially downwardly to a trough point and then axially upwardly and radially outwardly to the top squish surface, and
      a swirl pocket that includes a bottom concave arcuate surface extending axially downwardly and radially inwardly from the radially inner planar shelf surface and defining a lower axial extremity that is spaced axially away from the top squish surface a second axial distance, and a ratio of the first axial distance to the second axial distance ranges from 10% to 15%.

16. The piston of claim 15 wherein the trough point is spaced axially away from the top squish surface a third axial distance that is greater than the first axial distance but is less than the second axial distance.

17. The piston of claim 16 wherein the swirl pocket includes a first conical surface that is interposed radially and axially between the radially inner planar shelf surface and the bottom concave arcuate surface, and defines a tangent that forms an acute angle with the top squish surface projected onto the plane containing the longitudinal axis and the radial direction ranging from 70 degrees to 80 degrees.

18. The piston of claim 17 wherein the swirl pocket includes a second conical surface extending tangentially from the bottom concave arcuate surface toward the longitudinal axis, forming an outside obtuse angle with the longitudinal axis ranging from 110 degrees to 130 degrees when projected onto the plane containing the longitudinal axis and the radial direction, the first radial dimension of the top squish surface ranges from 1.5 mm to 2.5 mm, and further including a peak that extends from the second conical surface that is centered at the longitudinal axis, the peak being spaced axially away from the top squish surface an axial offset distance projected onto the plane containing the longitudinal axis and the radial direction ranging from 3.0 mm to 6.0 mm, and the peak is formed by a convex arcuate surface.

19. The piston of claim 15 wherein the undulating transitional surface includes a convex blend portion connected to the radially inner planar shelf surface, and defining a convex blend portion radius of curvature ranging from 4.0 millimeters to 6.0 millimeters, a concave blend portion connected to the convex blend portion, defining the trough point and a concave blend portion radius of curvature ranging from 3.0 millimeters to 4.0 millimeters, and a transitional portion connecting the concave blend portion to the top squish surface.

* * * * *